United States Patent
Al Rasheed et al.

(10) Patent No.: US 10,581,259 B2
(45) Date of Patent: Mar. 3, 2020

(54) BATTERY SWITCHING SYSTEM

(71) Applicant: DENSO International America, Inc., Southfield, MI (US)

(72) Inventors: Asif Al Rasheed, Royal Oak, MI (US); Adam Gilley, Detroit, MI (US)

(73) Assignee: DENSO International America, Inc., Southfield, MI (US)

( * ) Notice: Subject to any disclaimer, the term of this patent is extended or adjusted under 35 U.S.C. 154(b) by 317 days.

(21) Appl. No.: 15/398,914

(22) Filed: Jan. 5, 2017

(65) Prior Publication Data
US 2018/0191185 A1  Jul. 5, 2018

(51) Int. Cl.
| | |
|---|---|
| *H02J 7/00* | (2006.01) |
| *B60L 1/14* | (2006.01) |
| *B60L 1/02* | (2006.01) |
| *B60L 50/16* | (2019.01) |
| *B60L 58/20* | (2019.01) |
| *B60L 50/61* | (2019.01) |
| *B60L 58/21* | (2019.01) |
| *B60L 50/15* | (2019.01) |
| *B60L 58/13* | (2019.01) |
| B60R 16/033 | (2006.01) |
| B60L 15/20 | (2006.01) |

(52) U.S. Cl.
CPC .............. *H02J 7/0054* (2013.01); *B60L 1/02* (2013.01); *B60L 1/14* (2013.01); *B60L 50/15* (2019.02); *B60L 50/16* (2019.02); *B60L 50/61* (2019.02); *B60L 58/13* (2019.02); *B60L 58/20* (2019.02); *B60L 58/21* (2019.02); *B60L 15/2045* (2013.01); *B60L 2240/54* (2013.01); *B60R 16/033* (2013.01); *B60Y 2200/92* (2013.01)

(58) Field of Classification Search
CPC .............................. H02J 7/0054; B60R 16/033
USPC .......................................................... 320/104
See application file for complete search history.

(56) References Cited

U.S. PATENT DOCUMENTS

| | | | |
|---|---|---|---|
| 6,452,362 | B1 | 9/2002 | Choo |
| 7,750,600 | B2 | 7/2010 | Stanzel et al. |
| 8,004,242 | B1 * | 8/2011 | Purkey ................... B60R 16/033 320/130 |
| 8,803,479 | B2 | 8/2014 | Kim |
| 2002/0109485 | A1 | 8/2002 | Wu |
| 2004/0246341 | A1 | 12/2004 | Lee et al. |

(Continued)

*Primary Examiner* — Drew A Dunn
*Assistant Examiner* — Tessema Kebede
(74) *Attorney, Agent, or Firm* — Harness, Dickey & Pierce, P.L.C.

(57) ABSTRACT

A battery switching system for a vehicle controls a first battery device and a second battery device, which provide power to a vehicular load. The system includes multiple switch circuits and a battery control module. The switch circuits are operable for electrically coupling and decoupling each of the first battery device and the second battery device to the load and electrically coupling and decoupling the first battery device from the second battery device. Each of the switch circuits is operable in a closed state and an open state. The battery control module operates the switch circuits based predetermined conditions to form a first electrical path to electrically couple the first and second battery devices, a second electrical path to electrically couple the second battery device and the vehicular load, or a third electrical path to electrically couple the first battery device and the vehicular load.

8 Claims, 4 Drawing Sheets

(56) References Cited

U.S. PATENT DOCUMENTS

| | | | |
|---|---|---|---|
| 2008/0036419 A1* | 2/2008 | Cook | H02J 7/0031 320/104 |
| 2011/0127830 A1* | 6/2011 | Harding | B60R 16/033 307/10.7 |
| 2012/0074894 A1* | 3/2012 | Chen | B60L 11/005 320/103 |
| 2013/0162030 A1* | 6/2013 | Sonesson | B60L 1/00 307/10.1 |
| 2016/0288746 A1* | 10/2016 | Namuduri | F02N 11/08 |
| 2018/0015891 A1* | 1/2018 | Taniguchi | B60R 16/033 |

* cited by examiner

BATTERY SWITCHING SYSTEM

FIELD

The present disclosure relates to a battery switching system for a vehicle.

BACKGROUND

This section provides background information related to the present disclosure which is not necessarily prior art. Vehicles can include one or more batteries that supply power to electrical devices (i.e., load) within the vehicle at various operating conditions of the vehicle. For example, as the main power source, a primary battery device can be used to start an engine of the vehicle and supply power to the electrical devices from an alternator connected to the engine. When the engine is off, the electrical devices may continue to receive power from the primary battery device until the electric charge of the primary battery device decreases to a preset threshold. The vehicle may also include an auxiliary battery device that may operate as a back-up battery for providing power to the electrical devices.

The primary battery device and the auxiliary battery device may be connected and disconnected from the load by way of mechanical switches, such as relays. While relays are capable of switching between the primary battery device and the auxiliary battery device, the relays present multiple disadvantages and challenges. For example, over time, contacts of the relays may begin to corrode or weld, and thus need to be cleaned, which reduces current handling capability of the relay. In addition, due to their size, the relays are typically mounted on a separate circuit board and, thus, require additional space in the vehicle. Therefore, there is a need for a more efficient and smaller battery switching system for controlling the connection of the batteries to the load and to each other.

SUMMARY

This section provides a general summary of the disclosure, and is not a comprehensive disclosure of its full scope or all of its features.

The present disclosure is directed to a battery switching system for a vehicle to control a first battery device and a second battery device different from the first battery device. The first battery device and the second battery device are disposed in the vehicle and provide power to a vehicular load.

The battery switching system may include a plurality of switch circuits and a battery control module. The switch circuits may be operable for electrically coupling and decoupling each of the first battery device and the second battery device to the load and electrically coupling and decoupling the first battery device from the second battery device. Each of the switch circuits is operable in a closed state and an open state. The battery control module may be configured to operate one or more of the plurality of switch circuits based on one or more predetermined conditions to form a first electrical path, a second electrical path, or a third electrical path. The first electrical path may electrically couple the first battery device and the second battery device, the second electrical path may electrically couple the second battery device and the vehicular load, and the third electrical path may electrically couples the first battery device and the vehicular load.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
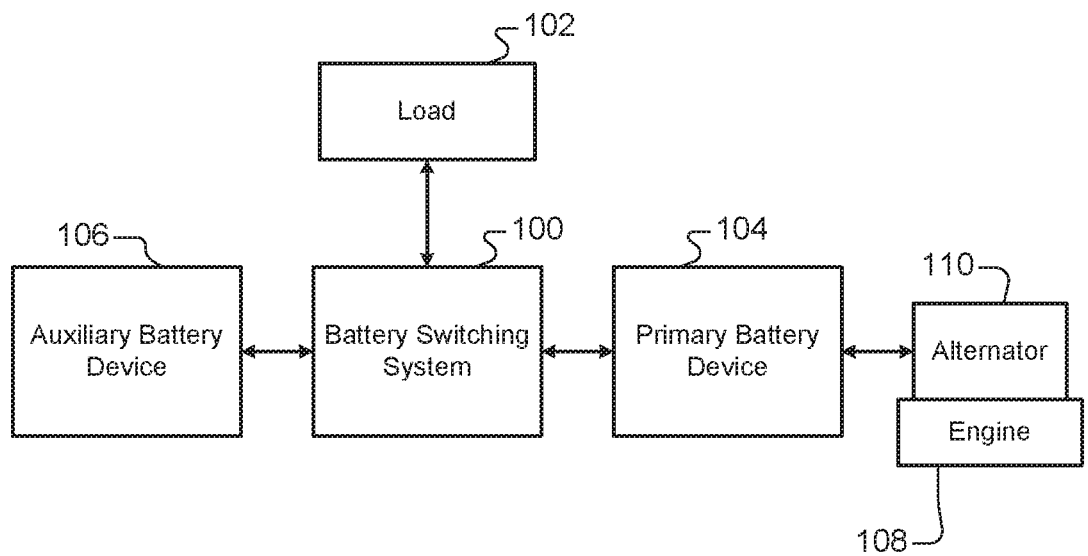
FIG. 1 is a block diagram of a vehicle system including a battery switching system of the present disclosure.

Example embodiments will now be described more fully with reference to the accompanying drawings.

In an example embodiment, a battery switching system 100 controls the electrical power provided to a vehicle load 102 by a primary battery device 104 (i.e., a first battery device) and an auxiliary battery device 106 (i.e., a second battery device). The primary battery device 104 and the auxiliary battery device 106 may be collectively referred to as batteries 104 and 106. The battery switching system 100, which may also be referred to as a battery management system, may be incorporated in, for example, a semi-truck having a sleeper compartment for a driver. For example, a semi-truck may require multiple batteries to start the engine of the truck and to power electrical devices used by the driver when the engine is off, such as interior lights, climate control system, and/or infotainment center. The battery switching system 100 of the present disclosure may be implemented in other suitable vehicles, such as a hybrid vehicle, and should not be limited to semi-trucks.

The primary battery device 104 may include one battery or multiple batteries coupled in parallel. The primary battery device 104 may be referred to as a starter battery and supplies power to the load 102. The load 102 may include various electrical devices within the vehicle, such as interior lights, instrument panel, entertainment console, ignition, compressor, and/or electric motors. When the engine 108 is operating (i.e., ON state), the primary battery device 104 may supply electric power from an alternator 110 to the load 102. When the engine is in an OFF-state, the primary battery device 104 may continue to supply power to the load 102.

The auxiliary battery device 106 may include one battery or multiple batteries coupled together in parallel. In the example embodiment, the auxiliary battery device 106 is a back-up electrical power source when the voltage of the primary battery device 104 is below a predetermined threshold. For example, the auxiliary battery device 106 may be electrically coupled to the load 102 and provide power to the load 102 when the engine is OFF and the primary battery device 104 is uncharged (i.e., voltage of the primary battery device is below a threshold). With the auxiliary battery device 106 supplying power, the voltage of the auxiliary battery device 106 decreases and, thus, the primary battery device 104 may charge the auxiliary battery device 106 when the electric charge (i.e., voltage) of the auxiliary battery device 106 falls below a charge threshold ($V_{CH\_TH}$).

Figure 2:
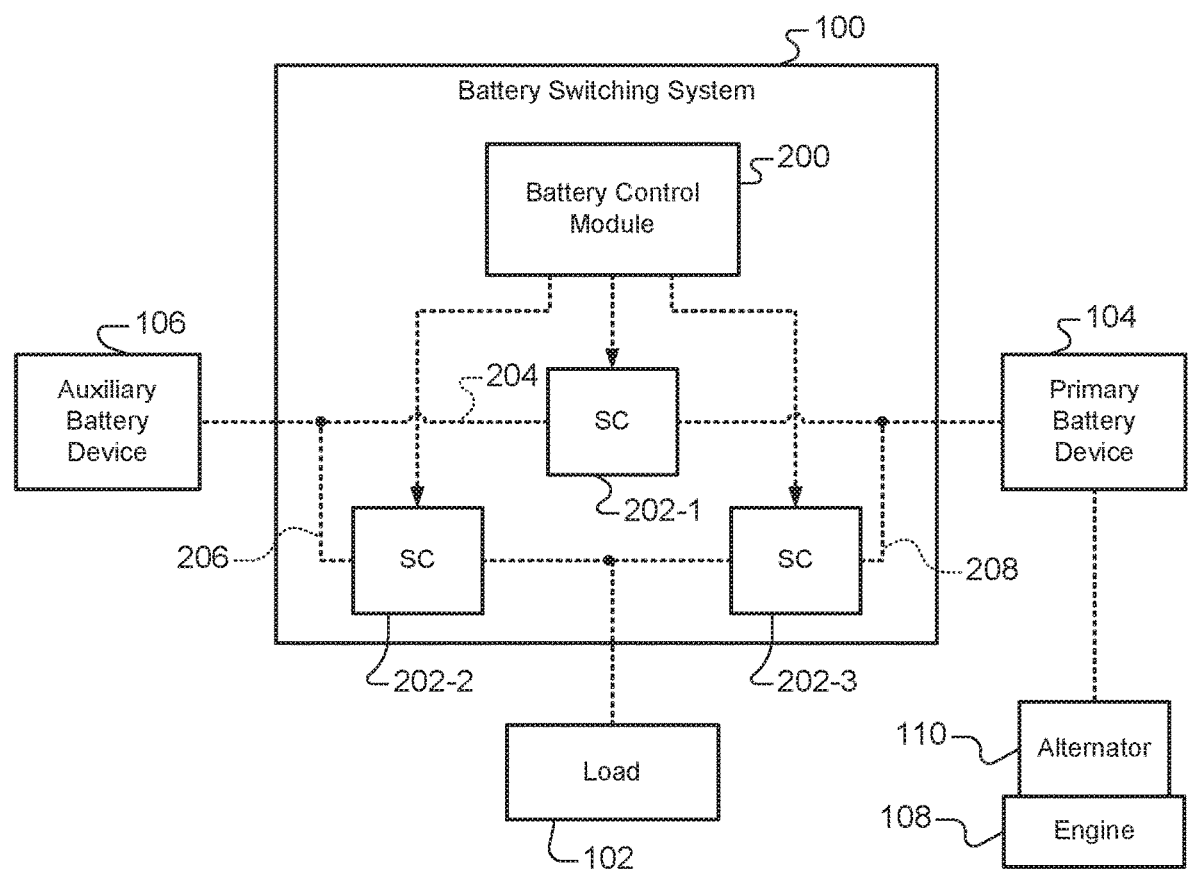
FIG. 2 is a block diagram of the battery switching system.

The battery switching system 100 monitors the operation state of the batteries 104 and 106, and electrically couples one of the primary battery device 104 or the auxiliary battery device 106 to the load 102. With reference to FIG. 2, the battery switching system 100 may include a battery control module 200 and multiple solid state switches that are operable to control the electrical connection between the load 102 and the batteries 104 and 106, and between the primary battery device 104 and the auxiliary battery device 106.

In the example embodiment, the battery switching system 100 includes switch circuits (SC) 202 (i.e., 202-1, 202-2, and 202-3) that are solid state switches configured to operate in a closed state to electrically couple components or in an open state to electrically decouple the components. The switch circuits 202 may include a switch element such as a transistor (e.g., FET, MOSFET) for controlling the flow of electric current between two nodes. For example, if the switch circuits 202 include an n-type MOSFET, a voltage may be applied to the gate of the MOSFET to have electric current flow between the drain and the source. Thus, the MOSFET operates as a closed switch. Alternatively, when no voltage is applied to the gate, no electric current flows between the drain and the source and, therefore, the MOSFET operates as an open switch. The switch circuits 202 may be configured in various suitable ways. For instance, the switch circuits 202 may have a p-type MOSFET, such that the switch circuits 202 may be in a closed state when no voltage is applied to the MOSFET and may be in the open state when voltage is applied. In addition to or in lieu of the transistor, it is readily understood that the switch circuits 202 may include other electrical components, such as resistors, capacitors, drivers, and diodes.

In the example embodiment, the switch circuit 202-1 is configured to electrically couple and decouple the primary battery device 104 and the auxiliary battery device 106. In the closed state, the switch circuit 202-1 forms a first electrical path 204 to have electric current flow between the primary battery device 104 and the auxiliary battery device 106. Accordingly, the primary battery device 104 may charge the auxiliary battery device 106 by way of the first electrical path 204.

The switch circuit 202-2 is configured to electrically couple and decouple the auxiliary battery device 106 and the load 102. With the switch circuit 202-2 in the closed state, the auxiliary battery device 106 supplies power to the load 102 by way of a second electrical path 206, and with the switch circuit 202-2 in the open state, the load 102 is electrically decoupled from the auxiliary battery device 106.

The switch circuit 202-3 is configured to electrically couple and decouple the primary battery device 104 and the load 102. With the switch circuit 202-3 in the closed state, the load 102 receives power from the primary battery device 104 by way of a third electrical path 208, and with the switch circuit 202-3 in the open state, the load 102 is electrically decoupled from the primary battery device 104.

In the example embodiment, each of the electrical paths is depicted as being controlled by one switch circuit 202. Alternatively, each of the electrical paths may be controlled by multiple switch circuits (i.e., a set of switch circuits) from among a plurality of switch circuits.

The battery control module 200 controls the switch circuits 202 to place the respective switch in an open state or a closed state based on one or more predetermined conditions. For example, in the example embodiment, the battery control module 200 controls the switch circuits 202 based on the operation state of the engine 108, and the state of charge or voltage of the primary battery device 104 and the auxiliary battery device 106.

Figure 3:
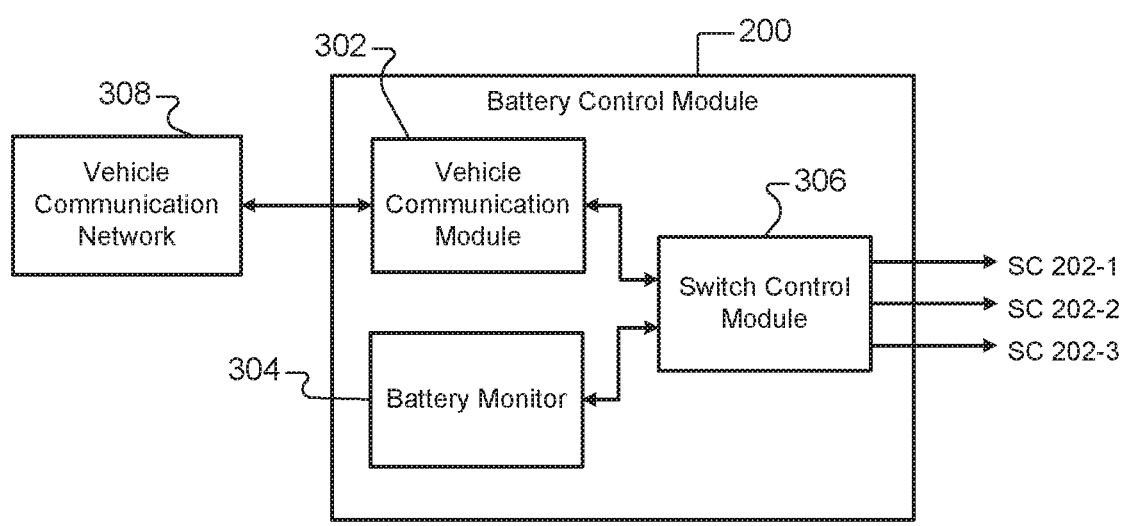
FIG. 3 is a block diagram of a battery control module of the battery switching system.

With reference to FIG. 3, an example embodiment of the battery control module 200 is provided. The battery control module 200 may include a vehicle communication module 302, a battery monitor 304, and a switch control module 306. The communication module 302 may be coupled to a vehicle communication network 308 to communicate with other modules and/or sensors disposed in the vehicle. For example, the communication module 302 may communicate with an engine control module by way of the network 308 to determine if the engine is in an ON state or an OFF state. The vehicle communication network 308 may be a wired system such as LIN or CAN, and/or a wireless communication system in which modules in the vehicle communicate by way of short-range wireless network, such as Bluetooth or Wifi.

The battery monitor 304 may monitor the operation state of the batteries 104 and 106. The operation state may include a state of charge of the batteries 104 and 106, voltage level of the batteries 104 and 106, and/or other information for determining the charge state of the batteries 104 and 106. For example, the battery monitor 304 may include a sensor connected to the batteries 104 and 106 to detect the voltage across the batteries 104 and 106. Alternatively, the battery monitor 304 may receive the voltage or the state of charge of the batteries 104 and 106 from one or more modules disposed in the vehicle by way of the network 308 and the communication module 302.

The switch control module 306 may include a microcontroller and may be configured to operate the switch circuits 202 to control the batteries 104 and 106. In particular, the switch control module 306 determines whether one or more predetermined conditions are met and then operates the switch circuits 202 to electrically couple and/or decouple the batteries 104 and 106 to/from the load 102 or to/from each other.

In the example embodiment, the switch control module 306 transmits a signal to the switch circuits 202 to place the switch circuits 202 in a closed state or an open state. For example, the switch circuits 202 may be placed in the closed state when a high level signal (e.g., a "1" or 5V) is applied to the switch circuit 202 and is placed in the open state when a low level signal (e.g., a "0" or 0V) is applied to the switch circuit 202. Alternatively, the switch circuit 202 may be configured to be in the closed state when a low level signal is applied to switch circuit 202 and in the open state when a high level signal is applied to the switch circuit 202. In response to the signal from the switch control module 306, a driver provided in the switch circuits 202 may produce the requisite voltage level for actuating the switch element, such as the transistor. In an alternative embodiment, the switch control module 306 may include a driver that outputs three drive voltage signals to the switch circuits 202 for actuating the switching element.

In the example embodiment, the switch control module 306 controls the switch circuits 202 such that the primary battery device 104 is electrically coupled to the load 102 when the engine 108 is in the ON-state. For example, the switch control module 306 closes the switch circuit 202-3 to electrically couple the load 102 to the primary battery device 104 by way of the third electrical path 208. Accordingly, the load 102 receives power from the alternator 110 by way of the primary battery device 104 and the primary battery device 104 may be charged by the alternator 110. The switch control module 306 may also maintain the switch circuits 202-1 and 202-2 in the open state to electrically decouple the primary battery device 104 from the auxiliary battery device 106 and decouple the load 102 from the auxiliary battery device 106.

With the engine 108 in the ON-state, the switch control module 306 may also electrically couple the auxiliary battery device 106 to the primary battery device 104 to charge the auxiliary battery device 106. For example, when the voltage of the auxiliary battery device 106 (i.e., $V_{AUX}$) is less than an auxiliary charge threshold ($V_{CH\_TH}$), the switch control module 306 may close the switch circuit 202-1 to electrically couple the auxiliary battery device 106 to the primary battery device 104 via the first electrical path 204. The charge threshold is a predetermined value saved by the switch control module 306 and can be set at any suitable value. For example, the charge threshold may be set at a voltage indicative of 90% of the state of charge of the auxiliary battery device 106 so that the auxiliary battery device 106 is maintained at full charge when the engine 108 is in the ON state.

Conversely, when the engine 108 is in the OFF-state, the switch control module 306 may control the batteries 104 and 106 to electrically couple one of the batteries 104 and 106 to the load 102. For example, with the engine 108 in the OFF-state, one or more vehicular sub-systems, such as the climate system and/or infotainment system, may be operating and, therefore, require electrical power. In the example embodiment, if the voltage of the primary battery device 104 ($V_{PR}$) is greater than or equal to a primary operation threshold ($V_{PR\_TH}$), the switch control module 306 electrically couples the load 102 to the primary battery device 104 by closing the switch circuit 202-3. Accordingly, the primary battery device 104 and the load 102 are electrically coupled by way of the third electrical path 208. With the primary battery device 104 electrically coupled to the load 102 and the engine being OFF, the switch circuits 202-1 and 202-2 may be in the open state to electrically decouple the primary battery device 104 and the auxiliary battery device 106 and decouple the auxiliary battery device 106 and the load 102. The primary operation threshold may be based on the amount of voltage needed to start the engine 108 of the vehicle, thereby ensuring that the primary battery device 104 has enough power to start the engine 108. It should be readily understood that the primary battery device 104 may be maintained at other suitable voltage thresholds, and is not limited to an engine start voltage.

In the event that the voltage of the primary battery device 104 is less than the primary operation threshold, the switch control module 306 electrically couples the load 102 to the auxiliary battery device 106 if the voltage level of the auxiliary battery device 106 is greater than an auxiliary operation threshold ($V_{AUX\_OPTH}$). More particularly, the switch control module 306 operates the switch circuit 202-2 in the closed state to form the second electrical path 206 and operates the switch circuits 202-1 and 202-3 in the open state to electrically decouple the primary battery device 104 from the load 102 and decouple the auxiliary battery device 106 from the primary battery device 104. The auxiliary operation threshold is a predetermined value saved by the switch control module 306 and can be set at any suitable value. For example, the charge threshold may be set at a voltage indicative of 20% of the state of charge of the auxiliary battery device 106.

If the voltage level of the auxiliary battery device 106 is less than the auxiliary operation threshold, then the switch control module 306 electrically decouples the primary battery device 104 and the auxiliary battery device 106 from the load 102 and no power is provided to the load 102. For example, the switch control module 306 controls the switch circuits 202-1, 202-2, and 202-3 in the open state to prevent the batteries 104 and 106 from being fully drained of power.

Figure 4:
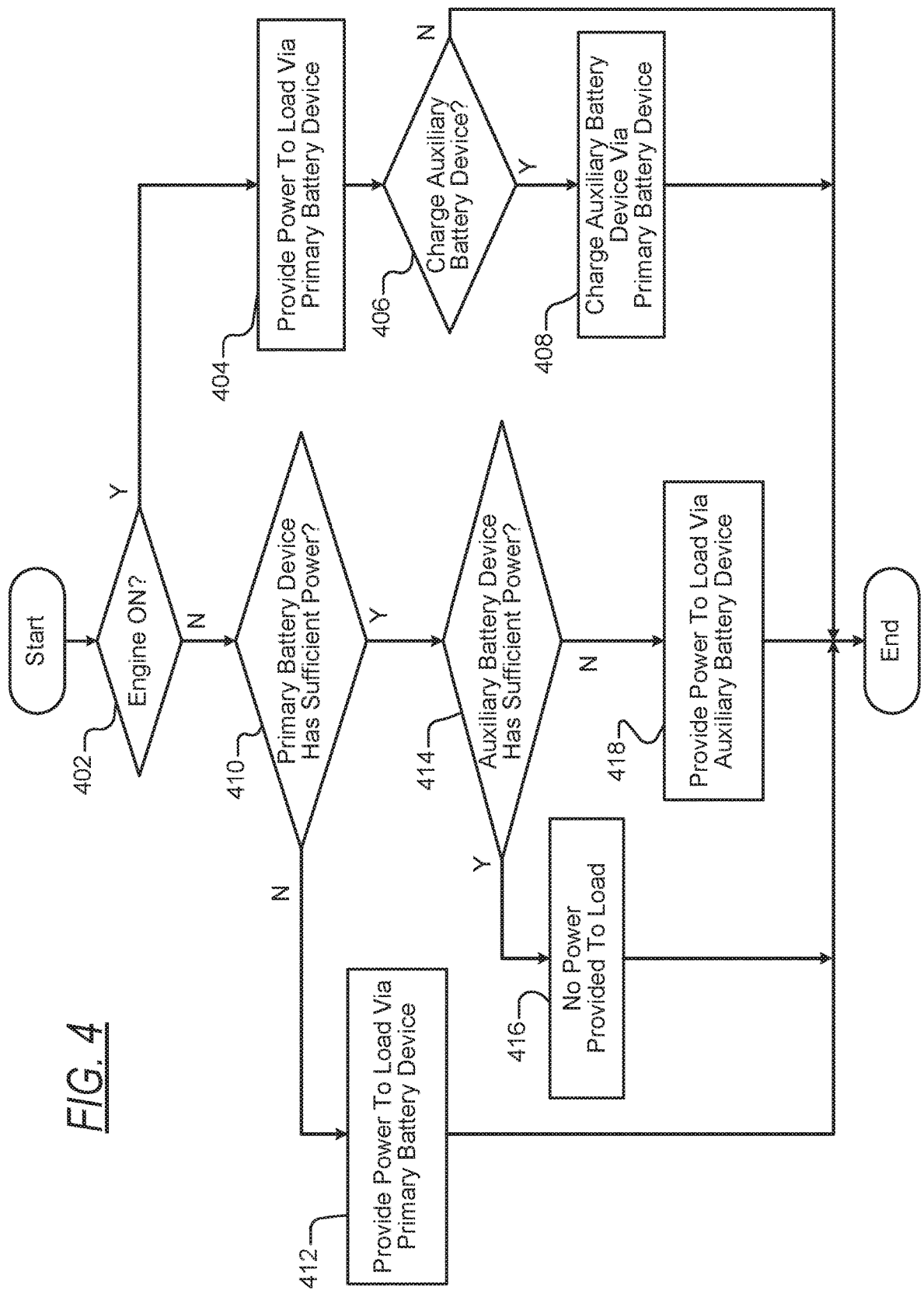
FIG. 4 is a flowchart of an example battery switch control routine executed by the battery switching system.

FIG. 4 illustrates an example battery switch control routine executed by the battery switching system 100 of the present disclosure for controlling the power provided to the load 102. At 402, the routine determines whether the engine 108 is in an ON-state based on information obtained from the vehicle communication network 308. For example, an engine control module located in the vehicle may transmit information regarding the operating state of the engine 108 via the vehicle communication network 308.

If the engine 108 is on, the system 100 provides power to the load 102 via the primary battery device 104, at 404. For example, the system 100 electrically couples the primary battery device 104 to the load 102. From 404, the system 100 determines if the auxiliary battery device 106 needs to be charged, at 406. For example, the system 100 determines if the voltage of the auxiliary battery device ($V_{AUX}$) is less than or equal to the charge threshold (i.e., $V_{AUX} \leq V_{CH\_TH}$). If the auxiliary battery device voltage is greater than the threshold, then the routine ends. If the auxiliary battery device voltage is less than the threshold, then the system 100, at 408, charges the battery 106 by electrically coupling the auxiliary battery device 106 to the primary battery device 104.

If the engine 108 is in the OFF-state, the system 100 determines if the primary battery device 104 has a sufficient amount of voltage to power the load 102, at 410. For example, the system 100 determines if the primary battery voltage ($V_{PR}$) is less than or equal to the primary operation threshold (i.e., $V_{PR} \leq V_{PR\_TH}$). If the primary battery voltage is greater than the threshold, the system 100, at 412, provides power to the load 102 via the primary battery device 104 by electrically coupling the primary battery device 104 and the load 102.

If the primary battery voltage is less than or equal to the threshold voltage, then the system 100 determines whether the auxiliary battery device 106 has sufficient power for the load 102. For example, the system 100, at 414, determines whether the auxiliary battery voltage is less than or equal to the auxiliary operation threshold (i.e., $V_{AUX} \leq V_{AUX\_OPTH}$). If the auxiliary battery voltage is less than or equal to the threshold, the system 100 does not provide power to the load 102, at 416. For example, the system 100 electrically decouples both batteries 104 and 106 from the load 102. Alternatively, if the auxiliary battery voltage is greater than the threshold, then the system 100, at 418, provides power to the load 102 via the auxiliary battery device 106 by electrically coupling the auxiliary battery device 106 to the load 102.

Figure 5:
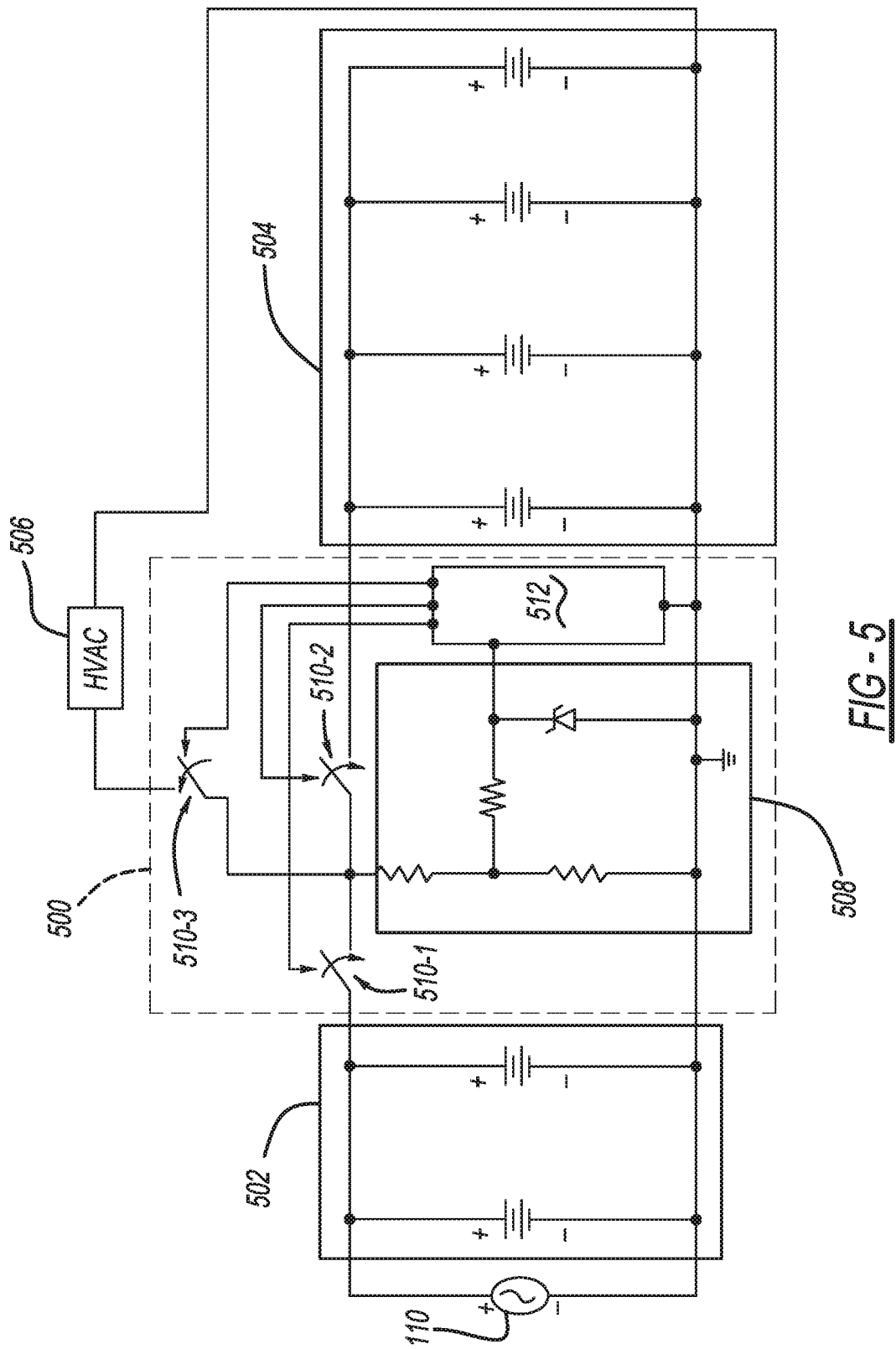
FIG. 5 is an example circuit diagram of a battery switching system of the present disclosure.

With reference to FIG. 5, an example circuit diagram of a battery switching system 500 is illustrated. The battery switching system 500 operates in similar manner as the battery switching system 100. The system 500 is coupled to a primary battery device 502 that includes two 12V batteries connected in parallel and an auxiliary battery device 504 that includes four 12V batteries coupled in parallel. In the example embodiment, the load is provided as a heating, ventilation, and air conditioning (HVAC) system 506, and the system 500 includes a voltage sampling circuit 508, switch circuits 510 (510-1, 510-2, and 510-3), and a battery control module 512.

The voltage sampling circuit 508 operates as a battery monitor to monitor the voltage of the primary battery device 502 and the auxiliary battery device 504. While illustrated as flip switches, the switch circuits 510 may include electrical components, such as transistors, diodes, resistors, capacitors, and drivers. In the example embodiment, the switch circuit 510-1 controls the electrical coupling of the primary battery device 502, the switch circuit 510-2 controls the electrical coupling of the auxiliary battery device 504, and the switch circuit 510-3 controls the electrical coupling of the HVAC 506.

The battery control module 512 is provided as a microcontroller that includes digital output ports for actuating the switch circuits 510. For example, to operate a given switch circuit 510 in a closed state, the battery control module 512 may output a "1" (i.e., a high level signal) and to operate the given switch circuit 510 in an open state, the battery control module 512 may output a "0" (i.e., a low level signal) to the switch circuit 510. Alternatively, to operate a given switch circuit 510 in a closed state, the battery control module 512 may output a "0" (i.e., a low level signal) and to operate the given switch circuit 510 in an open state, the battery control module 512 may output a "1" (i.e., a high level signal) to the switch circuit 510.

In operation, the battery switching system 500 may close the switch circuits 510-1 and 510-2 (e.g., a first set of switch circuits) to electrically couple the primary battery device 502 and the auxiliary battery device 504 via a first electrical path. To electrically couple the primary battery device 502 and the HVAC 506 via a second electrical path, the system 500 may close the switch circuit 510-1 and 510-3 (e.g., a second set of switch circuits). To electrically couple the auxiliary battery device 504 and the HVAC 506 via a third electrical path, the system may close the switch circuits 510-2 and 510-3 (e.g., a third set of switch circuits). To electrically couple the primary battery device 502 to both the auxiliary battery device 504 and the HVAC 506, the system 500 may close all of the switch circuits 510 (e.g., a fourth set of switch circuits). The battery switching system 500 may operate the switch circuits 510 based on, for example, the same operation conditions as in the system 100, as described above.

In the example embodiment, the operation state of the engine and the voltages of the primary battery device and the auxiliary battery device are evaluated by the battery control module for controlling the switch circuits. It should be readily understood that the battery switching system may actuate the switch circuits based on other suitable conditions, and should not be limited to those described herein. For example, in addition to monitoring the engine, the battery switching system may monitor the operation state of one or more subsystems in the vehicle to determine which electrical devices may require power. For instance, the battery switching system may receive information from a climate control module in the vehicle that indicates whether the climate control system (i.e., the HVAC system) is ON. If it is ON, the switching system can provide power to the components of the climate control system.

The battery switching system of the present disclosure utilizes, for example, solid state switches and a microcontroller for managing the primary battery device and the auxiliary battery device. The battery switching system is a smart system that monitors power demand of the vehicle and controls the electrical connection between the primary and auxiliary battery devices with the load and with each other. In using solid state switches, the size of the battery switching system can be reduced when compared with a switching system employing relays. In addition, the solid state switches require less power to actuate and may not cause noise in the vehicle, which is common with relays.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery switching system for controlling a first battery device and a second battery device different from the first battery device, the first battery device and the second battery device being disposed in a vehicle for providing power to a vehicular load, the battery switching system comprising:
  a plurality of switch circuits operable for electrically coupling and decoupling each of the first battery device and the second battery device to the load and electrically coupling and decoupling the first battery device from the second battery device, wherein each of the switch circuits is operable in a closed state and an open state; and
  a battery control module configured to operate one or more of the plurality of switch circuits based on one or more predetermined conditions to form at least one of a first electrical path, a second electrical path, or a third electrical path, wherein:
  the first electrical path electrically couples the first battery device and the second battery device,
  the second electrical path electrically couples the second battery device and the vehicular load,
  the third electrical path electrically couples the first battery device and the vehicular load,
  the battery control module electrically couples the first battery device and the vehicular load by way of the third electrical path when a voltage of the first battery device is greater than or equal to a first threshold,
  the battery control module electrically couples the first battery device and the second battery device by way of the first electrical path and electrically couples the first battery device and the vehicular load by way of the third electrical path when a voltage of the first battery device is greater than or equal to the first threshold, an engine in the vehicle is in an ON state, and a voltage of the second battery device is less than or equal to a second threshold, and
  the battery control module electrically couples the second battery device and the vehicular load by way of the second electrical path when a voltage of the first battery device is less than the first threshold and a voltage of the second battery device is greater than the second threshold;

wherein the plurality of switch circuits includes:
   a first set of switch circuits to electrically couple the first battery device and the second battery device,
   a second set of switch circuits to electrically couple the second battery device and the vehicular load, and
   a third set of switch circuits to electrically couple the first battery device and the vehicular load; and
wherein the battery control module is configured to operate the first set of switch circuits and the third set of switch circuits in the closed state to form the first electrical path and the third electrical path when a voltage of the first battery device is greater than or equal to the first threshold, an engine in the vehicle is in an ON state, and a voltage of the second battery device is less than or equal to the second threshold.

2. The battery switching system of claim 1 wherein the battery control module is configured to operate the second set of switch circuits in the closed state to form the second electrical path when a voltage of the first battery device is less than the first threshold and a voltage of the second battery device is greater than the second threshold.

3. The battery switching system of claim 1 wherein each of the plurality of switch circuits includes a transistor.

4. The battery switching system of claim 1 wherein the one or more predetermined conditions are based on a voltage level of the first battery device, a voltage level of the second battery device, and an operation state of an engine of the vehicle.

5. The battery switching system of claim 1 wherein the battery control module outputs a high level signal to operate a given switch circuit in one of a closed state or an open state, and outputs a low level signal to actuate the given switch circuit in the other one of the closed state or the open state.

6. A battery switching system for controlling a first battery device and a second battery device different from the first battery device, the first battery device and the second battery device being disposed in a vehicle for providing power to a vehicular load, the battery switching system comprising:
   a first set of switch circuits from among a plurality of switch circuits to electrically couple the first battery device and the second battery device;
   a second set of switch circuits from among the plurality of switch circuits to electrically couple the second battery device and the load;
   a third set of switch circuits from among the plurality of switch circuits to electrically couple the first battery device and the load; and
   a battery control module configured to operate one or more of the plurality of switch circuits based on one or more predetermined conditions, wherein:
   each of the plurality of switch circuits includes a solid state switch that is controlled by the battery control module,
   the battery control module outputs a first signal to place a given switch circuit in a closed state and a second signal different from the first signal to place the given switch circuit in an open state,
   the battery control module is configured to output the first signal to the second set of switch circuits to electrically couple the first battery device and the second battery device when an engine of the vehicle is in an ON state and the voltage of the first battery device is greater than or equal to a first threshold,
   the battery control module is configured to output the first signal to the first set of switch circuits and the third set of switch circuits to electrically couple the first battery device and the second battery device and to electrically couple the first battery and the load when a voltage of the first battery device is greater than or equal to the first threshold, the engine in the vehicle engine is in an ON state, and a voltage of the second battery device is less than or equal to a second threshold, and
   the battery control module is configured to output the first signal to the second set of switch circuits to electrically couple the second battery device to the load when a voltage of the first battery device is less than the first threshold and a voltage of the second battery device is greater than the second threshold.

7. The battery switching system of claim 6 wherein when a voltage of the first battery device is less than the first threshold and a voltage of the second battery device is less than the second threshold, the battery control module is configured to output the second signal to the second set of switch circuits and the third set of switch circuits to electrically decouple the first battery device and the load and to electrically decouple the second battery device and the load.

8. The battery switching system of claim 6 wherein each of the plurality of switch circuits includes a transistor.

* * * * *